(12) United States Patent
Mironov

(10) Patent No.: US 9,120,247 B2
(45) Date of Patent: Sep. 1, 2015

(54) WIND TURBINE BLADE MOULD SIDE SHAPE ADJUSTMENT DEVICE

(75) Inventor: Gabriel Mironov, Montreal (CA)

(73) Assignee: Suzhou Red Maple Wind Blade Mould Co., Ltd., Jiangsu (CN)

( * ) Notice: Subject to any disclaimer, the term of this patent is extended or adjusted under 35 U.S.C. 154(b) by 615 days.

(21) Appl. No.: 13/394,619

(22) PCT Filed: Sep. 9, 2010

(86) PCT No.: PCT/CN2010/001383
§ 371 (c)(1),
(2), (4) Date: Apr. 30, 2012

(87) PCT Pub. No.: WO2011/029273
PCT Pub. Date: Mar. 17, 2011

(65) Prior Publication Data
US 2012/0205051 A1 Aug. 16, 2012

(30) Foreign Application Priority Data
Sep. 10, 2009 (CN) ............... 2009 2 0177605 U

(51) Int. Cl.
| B29C 33/22 | (2006.01) |
| B29C 33/30 | (2006.01) |
| B29C 33/20 | (2006.01) |
| F03D 1/06 | (2006.01) |
| B29L 31/08 | (2006.01) |

(52) U.S. Cl.
CPC ............... *B29C 33/303* (2013.01); *B29C 33/20* (2013.01); *F03D 1/065* (2013.01); *B29L 2031/08* (2013.01); *Y02E 10/721* (2013.01)

(58) Field of Classification Search
USPC ............ 425/450.1, 451, 451.5, 451.6, 451.7, 425/451.9
See application file for complete search history.

(56) References Cited

U.S. PATENT DOCUMENTS

| 2002/0166430 A1 | 11/2002 | Capdeboscq |
| 2008/0277834 A1* | 11/2008 | Schibsbye ................ 264/334 |

FOREIGN PATENT DOCUMENTS

| CN | 1381341 A | 11/2002 |
| CN | 200995458 Y | 12/2007 |
| CN | 20155269 U | 8/2010 |
| JP | 7-148748 A | 6/1995 |
| JP | 7329081 A | 12/1995 |

OTHER PUBLICATIONS

Dec. 16, 2010 International Search Report and Written Opinion in corresponding Application No. PCT/CN2010/001383.

* cited by examiner

*Primary Examiner* — Ryan Ochylski
(74) *Attorney, Agent, or Firm* — Novak Druce Connolly Bove + Quigg LLP

(57) ABSTRACT

An wind turbine blade mould side adjustment device is provided, characterized in that the device is provided at a flange of the mould, and the side adjustment device comprises an upper part and a lower base, wherein the lower base is fixed on the mould frame and the upper part is capable of sliding over the lower base in a direction substantially parallel to the blade width direction. Such an improved side shape adjustment device for wind turbine blade moulds makes adjustment of the mould width easier and more efficient, and meanwhile allows the mould to readily expand in the blade longitudinal direction.

9 Claims, 5 Drawing Sheets

WIND TURBINE BLADE MOULD SIDE SHAPE ADJUSTMENT DEVICE

TECHNICAL FIELD OF THE INVENTION

The present invention relates to a wind turbine blade mould side shape adjustment device.

BACKGROUND OF THE INVENTION

In the past, blade producers often had problems with their mould shells suffering small deformations that increased with the number of blades produced, gradually becoming major errors in the blade shape. These deformations are caused by cycles of heating and cooling while the mould is under some pressure or load. Essentially the mould shell slowly becomes stretched out of shape as many blades are produced. This deformation overwhelmingly occurs in the cross section shape of the blade mould, as the two spanwise edges are normally supported by the sturdy steel backing frame.

It has earlier been proposed by the present Applicant to provide a mould with center shape adjustment devices, which are provided at the shell surface and provide adjustments only perpendicular to the shell surface, and flange shape adjustment devices, which are provided at the spanwise flanges of the mould and provide adjustments both perpendicular to and parallel with the shell surface. Particularly, the center shape adjustment devices and the flange shape adjustment devices comprise threaded adjustment devices. While the proposed adjustment devices did achieve the goal of making shape adjustment fast and easy, they suffered from some unexpected disadvantages:
1. When turning over the upper mould, the shell tended to move somewhat freely in the widthwise direction. This can cause unwanted shape change of the shell.
2. There is some slack in the threaded adjustment devices such as turnbuckle devices between the mould frame and the mould shell. This causes the gap at the joint between the two moulds to be difficult to regulate.

Further, it was found by experiment that:
1. Adjustment of the mould shape in the direction normal to the mould surface is quite Necessary in the middle area of the mould.
2. Adjustment of the mould shape in the direction normal to the mould surface is not normally required at the edges of the mould. However adjustment in the direction parallel to the mould surface (e.g. horizontally) is still important to regulate the width of the mould.

SUMMARY OF THE INVENTION

It has therefore been determined by the present inventor that the prior design as described above is quite suitable for the mould middle area; however a new side shape adjustment device is required for the mould edge or flange area.

It is an aim of the present invention to provide a side shape adjustment device for this improved adjustment task.

According to the present invention, there is provided a wind turbine blade mould side adjustment device, characterized in that the side adjustment device is provided at a flange of the mould, and the device comprises an upper part and a lower base, wherein the lower base is fixed on a mould frame and the upper part is capable of sliding over the lower base in a direction substantially parallel to the blade width direction.

Such an improved side shape adjustment device for wind turbine blade moulds makes adjustment of the mould width easier and more efficient, and meanwhile allows the mould to readily expand in the blade longitudinal direction. Such a device can allow free movement in the mould length direction, together with controlled adjustment in the mould width direction. In the preferred embodiments of the invention, no adjustment is normally required in the vertical direction normal to the mould surface; however a small adjustment is still possible, although inconvenient, and may be achieved by insertion or removal of shims.

According to an embodiment, the lower base is of a box shape and fixed on the mould frame, the upper part comprises a sliding upper plate having a nut block on its lower side and supports for the mould shell on its upper side, and the nut block is fit into an corresponding opening in an upper plate of the lower base that allows for free movement of the sliding upper plate in the widthwise direction of the mould.

According to an embodiment, an adjustment bolt is arranged substantially parallel to the widthwise direction of the mould, the adjustment bolt passes through the lower base on one side, through the nut block, and through the base on the other side, and the adjustment force is provided by turning the adjustment bolt, which then acts upon the nut block.

According to an embodiment, the upper sliding plate is further secured at the two sides thereof with locking bolts, which rest in slots of the upper sliding plate that allow for free movement in the widthwise direction of the mould; the locking bolts are provided to guide the upper sliding plate only in the blade widthwise direction during adjustment.

According to an embodiment, the nut block and the locking bolts may be tightened to prevent all movement of the upper part.

According to an embodiment, the adjustment bolt does not move axially, but merely revolves.

According to an embodiment, the locking bolts may be tightened after adjustment.

According to an embodiment, a shim may be set between the upper part and the lower base to provide an adjustment in the vertical direction normal to the mould surface.

According to an embodiment, the upper part is provided with a sliding mechanism that allows the mould shell to freely expand in the lengthwise direction.

BRIEF DESCRIPTION OF THE DRAWINGS

The present invention will now be described in detail by way of a non-limiting example and with reference to the accompanying drawings, wherein.

DETAILED DESCRIPTION OF THE PREFERRED EMBODIMENTS

Figure 1:
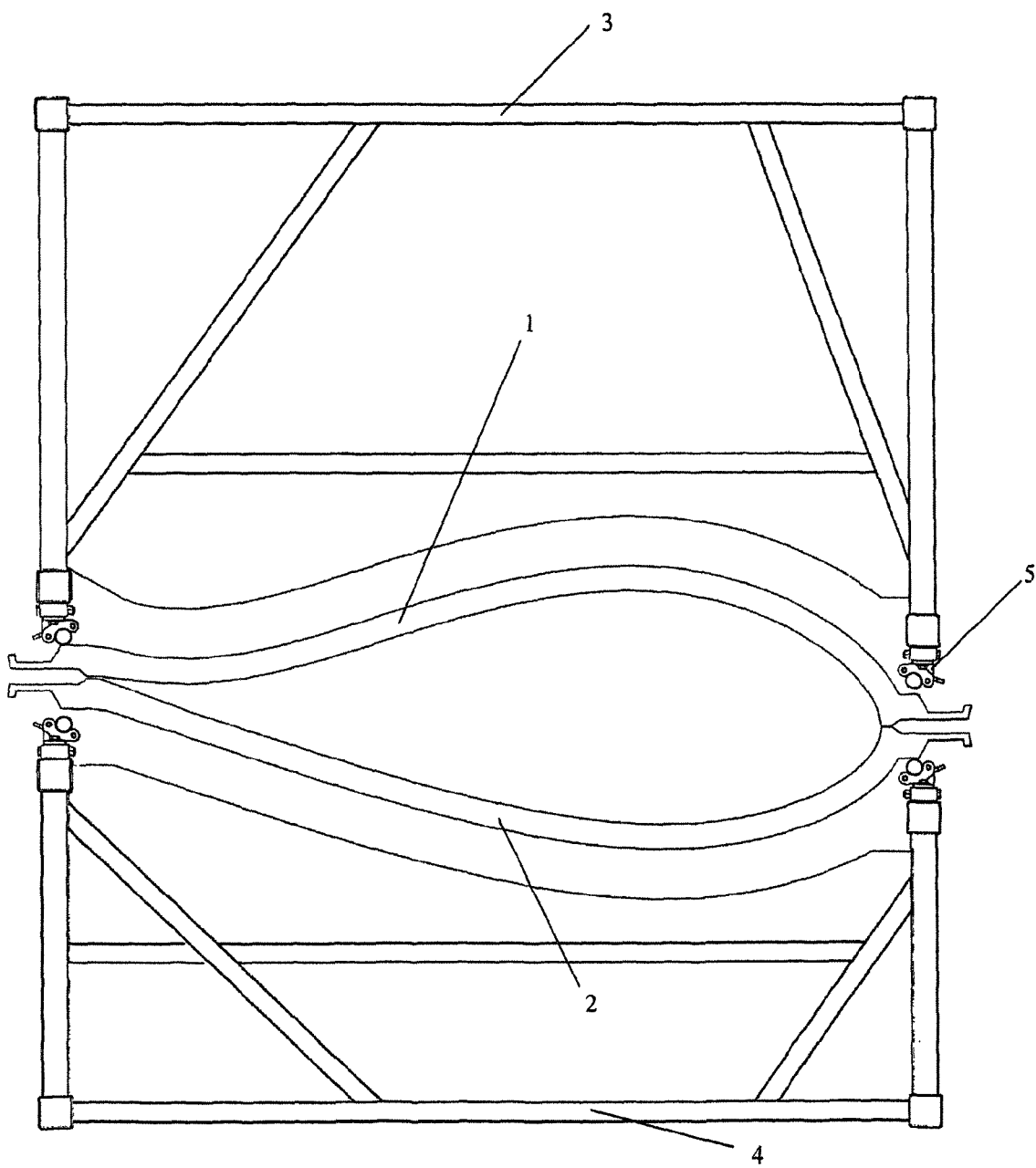
FIG. 1 is an end view of a wind turbine blade mould with side shape adjustment devices.

FIG. 1 shows a wind turbine blade mould, comprising a upper mould shell 1 supported by an upper mould frame 3 and a lower mould shell 2 supported by a lower mould frame 4. Each of the upper mould frame 3 and the lower mould frame 4 is provided with a pair of side shape adjustment devices 5 for adjusting the shape of the mould.

Figure 2:
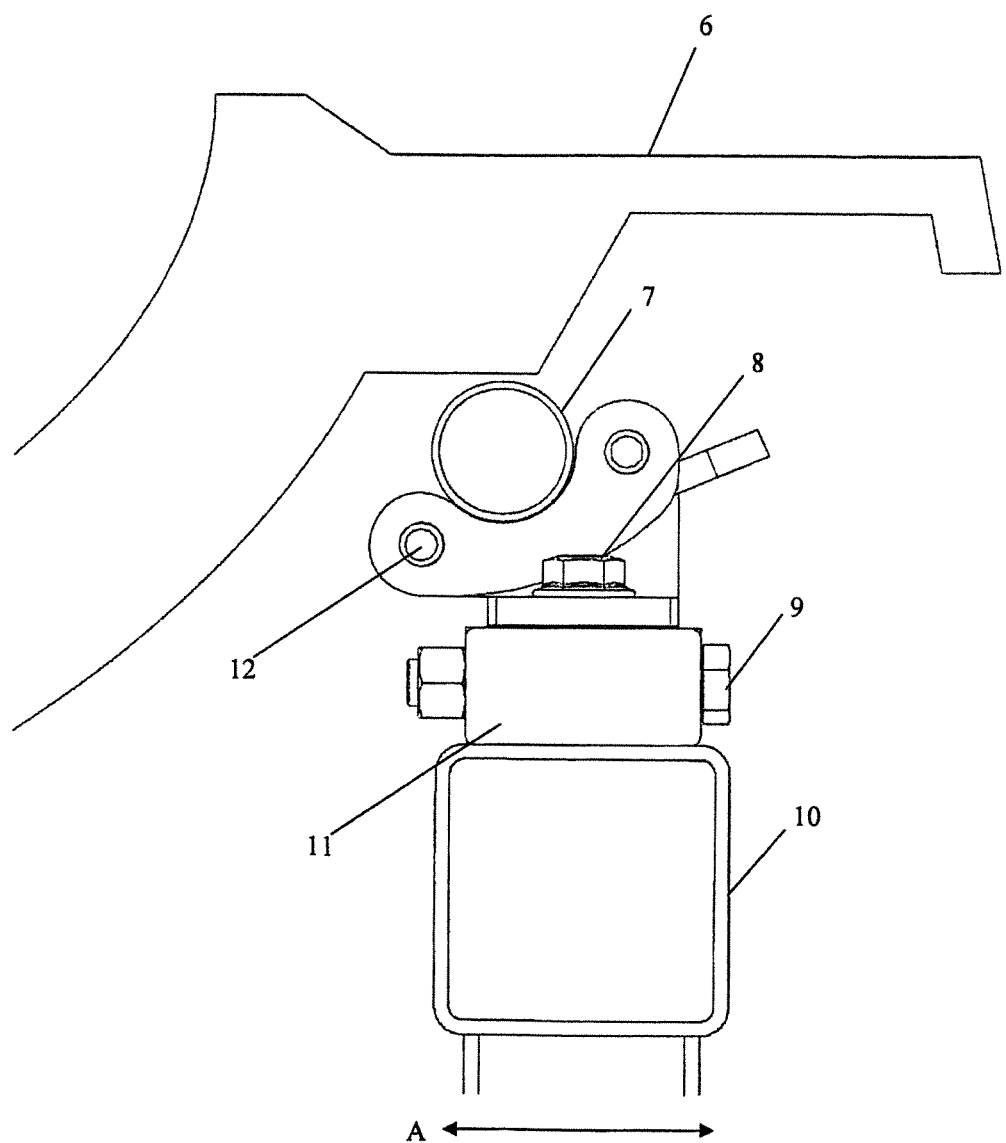
FIG. 2 is an enlarged view showing one side shape adjustment device of FIG. 1.
Figure 3:
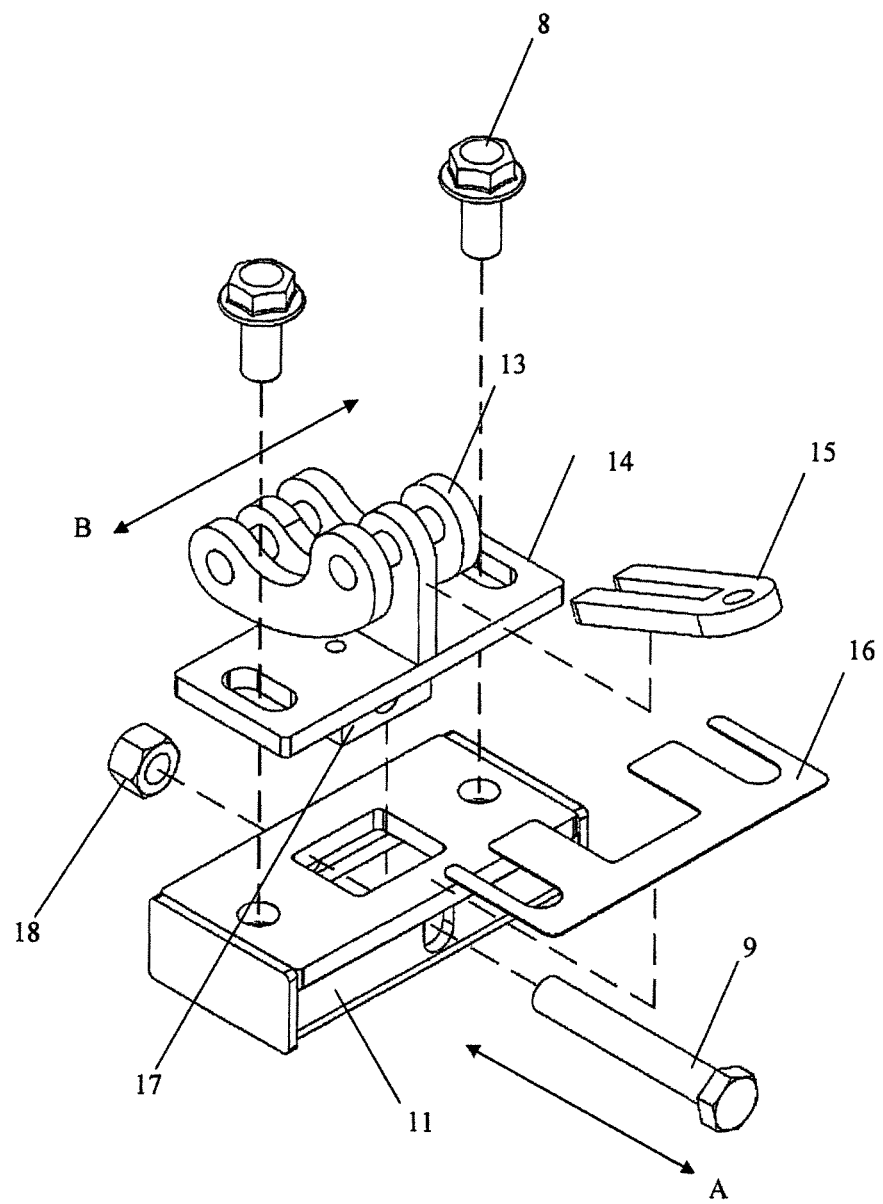
FIG. 3 is an exploded perspective view showing the side shape adjustment device of FIG. 2.
Figure 4:
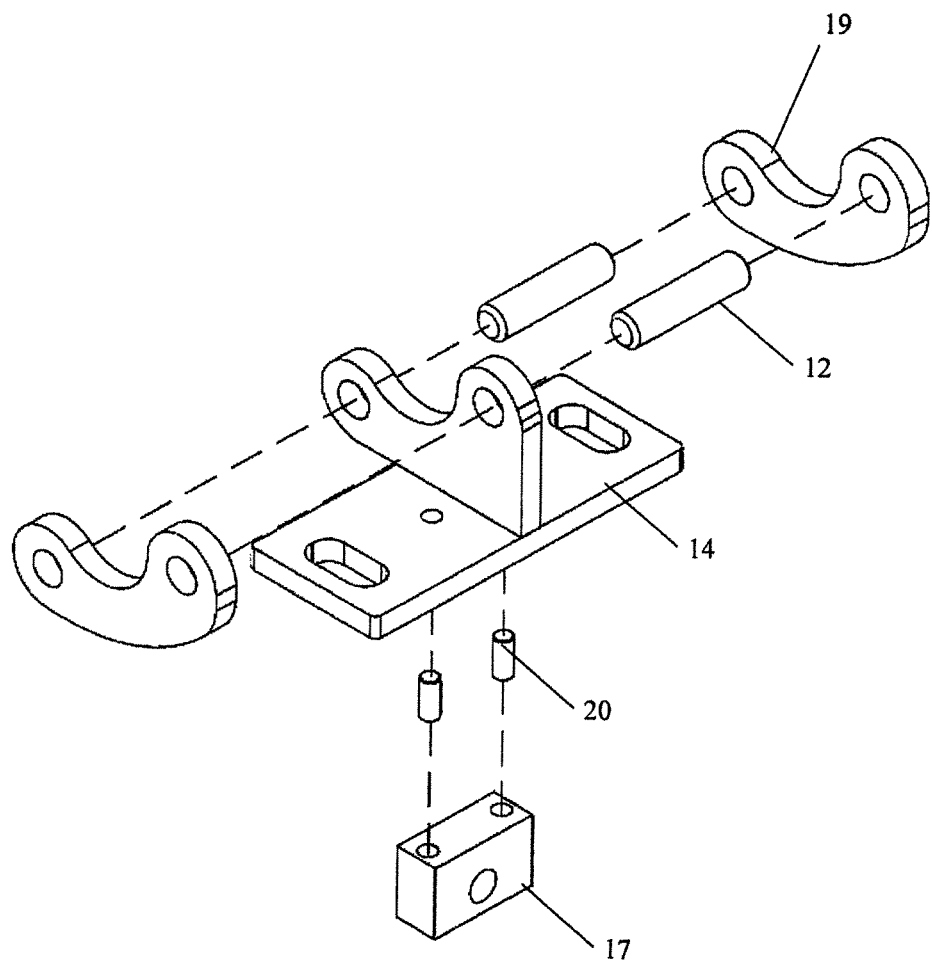
FIG. 4 is another exploded perspective view showing the upper part of the side shape adjustment device.

With reference to FIGS. 2-5, a detailed description will be given to a non-limiting example of the side shape adjustment device. For the sake of simplicity, since all the side shape adjustment devices are identical, only one of the side shape adjustment device will be described. As shown in FIG. 2, the mould shell is supported at a flange 6 thereof by the side shape adjustment device 5. The side shape adjustment device 5 mainly comprises an upper part 13 and a lower base 11.

Figure 5:
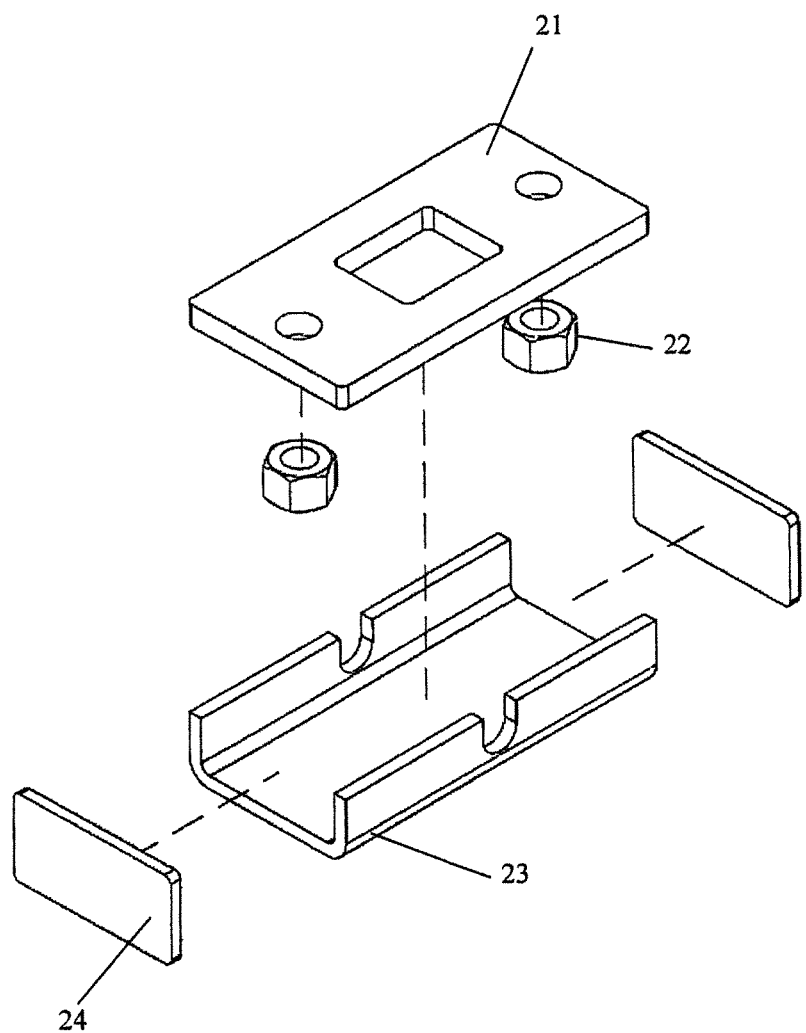
FIG. 5 is an exploded perspective view showing the lower base of the side shape adjustment device.

As shown in FIG. 5, the lower base 11 is of a box shape and is fixed on a frame tube 10. The lower base 11 may be made at a low cost as follows: cutting in half a piece of rectangular tubing to form a channel-shaped member 23, and welding an upper plate 21 on top and two end caps 24 at the ends. An ideal size for the raw material of the rectangular tubing is 100 mm×100 mm×5 mm. The upper plate 21 is desirably 8-15 mm in thickness.

The upper part 13 comprises a sliding upper plate 14 having a nut block 17 fixed on the central portion of its lower side by dowel pins 20 and supports for the mould shell on its upper side.

The upper part 13 and the lower base 11 are assembled as follows. The sliding upper plate 14 is placed onto the upper plate 21 of the lower base 11, with the nut block 17 fitted into a corresponding opening in the upper plate 21 that allows for free movement of the sliding upper plate 14 in the widthwise direction of the mould, but the nut block 17 may be tightened to prevent all movement. An adjustment bolt 9 is arranged substantially parallel to the widthwise direction of the mould, and serves to force the mould shell to become either wider or narrower. The adjustment bolt 9 passes through a threaded hole of the lower base 11 on one side, through a threaded hole of the nut block 17, and through another threaded hole of the lower base 11 on the other side. The adjustment bolt 9 is then captured by a lock nut 18 outside the lower base 11. The lock nut 18 may be advantageously fixed with thread locking adhesive. A suitable size for the adjustment bolt is M10.

The upper sliding plate 14 is further secured at the two sides thereof with two or four locking bolts 8, which rest in slots of the upper sliding plate 14 that allow for free movement in the widthwise direction of the mould as shown by the double arrow A in FIG. 2, but which may be tightened to prevent all movement. The locking bolts 8 are provided to guide the upper sliding plate 14 during adjustment and prevent it from rotating, skewing or otherwise moving except in the blade widthwise direction. The locking bolts 8 pass through corresponding openings at the upper plate 21 of the lower base 11 and tightened with two locking nuts 22 inside the lower base 11. Such locking bolts should ideally be from M10-M16 in size.

With such an assembly of the upper part 13 and the lower base 11, the upper part 13 supports the mould, and is free to slide over the lower base 11 in the widthwise direction of the blade by means of the adjustment bolt 9 and the slot. The adjustment force is provided by turning the adjustment bolt 9, which then acts upon the nut block 17. The adjustment bolt 9 may be a screw or threaded bar itself which does not substantially move axially, but merely revolves. The locking bolts 8 may be tightened after adjustment, preventing any accidental readjustment and greatly increasing the ability of the adjustment device to resist loads while the mould is being rotated or turned over.

A shim 16 may be advantageously set between the sliding upper plate 14 and the lower base 11 to provide a small adjustment in the vertical direction normal to the mould surface.

A round tube 7, for example of steel, may be welded directly to the sliding upper plate 14, for supporting the mould shell. The round steel tube 7 should be ideally from 40-60mm in diameter. Optionally, the mould shell may be freed to expand in the lengthwise direction, as shown by double arrow B in FIG. 3, by providing a sliding mechanism between the upper plate 21 and the round steel tube 7. In such a case, the supports on the upper side of the sliding upper plate 14 comprise a central plate integral with it and two C shaped holders 19. The sliding mechanism is advantageously constructed by using two bars 12, for example of steel, each about 20mm in diameter, sliding in the central plate with similarly sized holes, and welded at their ends to the C shaped holders 19. These C shaped holders 19 are then welded to the round steel tube 7, which supports the mould shell. In order to temporarily prevent the longitudinal free sliding, a locking key 15 may be provided between the two C shaped holders 19.

Other embodiments are conceivable, with more or fewer locking bolts, different shapes of lower base, different kinds of threaded bar for the widthwise adjustment or various sliding parts for the mould movement in the longitudinal direction. Alternatively, the side shape adjustment device may be constructed without the feature of free movement in longitudinal direction. Also possible is to use two adjustment bolts for widthwise adjustment, one on each side, instead of the captured adjustment bolt or threaded bar. The side shape adjustment device can also be used in combination with various middle shape adjustment devices.

A person skilled in the art can contemplate many modifications within the scope of the present invention. These modifications all fall in the scope of the present invention defined by the attached claims.

What is claimed is:

1. A wind turbine blade mould side adjustment device, characterized in that the device is provided at a flange of the mould, and the side adjustment device comprises an upper part and a lower base, wherein the lower base is fixed on the mould frame and the upper part comprises a sliding upper plate having a nut block on its lower side and supports for the mould shell on its upper side, and the nut block is fit into an corresponding opening in an upper plate of the lower base that allows for free movement of the sliding upper plate in the widthwise direction of the mould.

2. The device of claim 1, wherein the lower base is of a box shape and fixed on the mould frame.

3. The device of claim 1, wherein an adjustment bolt is arranged substantially parallel to the widthwise direction of the mould, the adjustment bolt passes through the lower base on one side, through the nut block, and through the base on the other side, and the adjustment force is provided by turning the adjustment bolt, which then acts upon the nut block.

4. The device of claim 3, wherein the adjustment bolt does not move axially, but merely revolves.

5. The device of claim 1, wherein the upper sliding plate is further secured at the two sides thereof with locking bolts, which rest in slots of the upper sliding plate that allow for free movement in the widthwise direction of the mould, and the locking bolts are provided to guide the upper sliding plate only in the blade widthwise direction during adjustment.

6. The device of claim 5, wherein the nut block and the locking bolts may be tightened to prevent all movement of the upper part.

7. The device of claim 5, wherein the locking bolts may be tightened after adjustment.

8. The device of claim 1, wherein a shim is positioned between the upper part and the lower base to provide an adjustment in the vertical direction normal to the mould surface.

9. The device of claim 1, wherein the upper part is provided with a sliding mechanism that allows the mould shell to freely expand in the lengthwise direction.

\* \* \* \* \*